(12) United States Patent
Fujihashi et al.

(10) Patent No.: US 6,262,903 B1
(45) Date of Patent: Jul. 17, 2001

(54) DIRECT-CURRENT POWER SUPPLY CIRCUIT HAVING CONTROL SECTIONS WITH AT LEAST ONE CONTROL SECTION HAVING PRIORITY OVER ANOTHER CONTROL SECTION

(75) Inventors: Yoshinori Fujihashi; Tetsuyasu Kitamura, both of Aichi-ken; Takuya Harada, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/471,231

(22) Filed: Dec. 23, 1999

(30) Foreign Application Priority Data

Dec. 24, 1998 (JP) .................................. 10-367351

(51) Int. Cl.[7] .................................................. H02M 7/217
(52) U.S. Cl. .............................................. 363/89; 363/127
(58) Field of Search ............................... 363/84, 89, 125, 363/126, 127

(56) References Cited

U.S. PATENT DOCUMENTS

| | | | |
|---|---|---|---|
| 4,685,046 | * | 8/1987 | Sanders ................................... 363/89 |
| 4,771,373 | * | 9/1988 | Rademaker ............................. 363/89 |
| 4,797,541 | * | 1/1989 | Billing et al. .......................... 363/97 |
| 5,420,780 | * | 5/1995 | Bernstein et al. ...................... 363/89 |
| 5,495,241 | * | 2/1996 | Donig et al. ........................... 323/282 |
| 5,715,154 | * | 2/1998 | Rault ...................................... 363/89 |
| 5,818,708 | * | 10/1998 | Wong ..................................... 363/89 |
| 5,831,841 | * | 11/1998 | Nishino ................................. 363/37 |
| 5,844,792 | * | 12/1998 | Moreau ................................. 363/89 |
| 5,877,614 | * | 3/1999 | Huber ..................................... 363/89 |
| 6,011,958 | * | 1/2000 | Yokota et al. ......................... 363/67 |

FOREIGN PATENT DOCUMENTS 64-55017   3/1989   (JP) ................................. H02H/9/04

* cited by examiner

*Primary Examiner*—Jeffrey Sterrett
(74) *Attorney, Agent, or Firm*—Pillsbury Winthrop LLP

(57) ABSTRACT

A direct-current power supply circuit, incorporated in an IC card, includes a coil for receiving an amplitude-modulated signal from an external device through electromagnetic induction. A full-wave rectifying circuit rectifies the amplitude-modulated signal received by the coil. The rectified output signal is used to charge a smoothing capacitor. A clamp circuit controls the terminal voltage of the smoothing capacitor to a predetermined level so as to produce a power supply voltage. The clamp circuit controls an output transistor to stabilize the power supply voltage to a constant level. Furthermore, the direct-current power supply circuit includes a short-circuit preventing circuit to forcibly turn off the output transistor when the electric potential difference between both ends of the coil is smaller than a predetermined value, thereby preventing the power supply voltage from suddenly decreasing due to delay of operation of the circuit elements when the coil output becomes zero due to amplitude modulation.

36 Claims, 12 Drawing Sheets

DIRECT-CURRENT POWER SUPPLY CIRCUIT HAVING CONTROL SECTIONS WITH AT LEAST ONE CONTROL SECTION HAVING PRIORITY OVER ANOTHER CONTROL SECTION

BACKGROUND OF THE INVENTION

The present invention relates to a direct-current power supply circuit associated with a coil or equivalent thereof which receives an incoming signal. An output signal of this coil is rectified and smoothed. The direct-current voltage obtained through the rectifying and smoothing operation is controlled to a predetermined constant voltage by a clamp circuit so as to produce a power supply voltage.

SUMMARY OF THE INVENTION

An object of the present invention is to provide a direct-current power supply circuit which includes a rectifying circuit and a smoothing capacitor for rectifying and smoothing an alternating-current input signal entered through a coil.

An object of the present invention is to provide a direct-current power supply circuit which further includes a clamp circuit for controlling the rectified and smoothed direct-current voltage to a preset voltage.

An object of the present invention is to prevent the power supply voltage produced from the direct-current power supply circuit from suddenly decreasing when the alternating-current signal entered through the coil is temporarily interrupted due to amplitude modulation.

In order to accomplish the above and other related objects, the present invention provides a first direct-current power supply circuit comprising a signal receiving section for receiving an alternating-current signal from the outside of the direct-current power supply circuit. A rectifying section rectifies an output of the signal receiving section. A smoothing section is provided for smoothing an output of the rectifying section. A first control section controls the operation of a switching section to produce a constant voltage. The switching section changes a voltage level of an output of the smoothing section. And, a second control section is connected between the signal receiving section and the first control section for prohibiting the switching operation of the switching section in accordance with a signal condition of the alternating-current signal received by the signal receiving section. In this case, the prohibition of the second control section has priority over the control of the first control section.

Preferably, the second control section prohibits the switching operation of the switching section in response to a change of amplitude modulation of the alternating-current signal received by the signal receiving section.

For example, the alternating-current signal received by the signal receiving section is an amplitude-modulated signal changeable up to 100% in the degree of amplitude modulation. In this case, the second control section prohibits the switching operation of the switching section in response to 100% amplitude modulation of the alternating-current signal received by the signal receiving section.

Preferably, the first control section is an analog circuit and the second control section is a digital circuit.

According to preferred embodiments of the present invention, the direct-current power supply circuit is incorporated in an IC card to or from which information is written or read, and the constant voltage produced by the first control section is used to activate a semiconductor integrated circuit accommodated in the IC card.

Furthermore, the present invention provides a second direct-current power supply circuit comprising a coil for receiving an alternating-current signal from the outside of the direct-current power supply circuit, a rectifying circuit for rectifying an output of the coil, a capacitor for smoothing an output of the rectifying circuit, and a clamp circuit for controlling the operation of a switching element to produce a constant voltage when the switching element controls the charging and discharging operations of the capacitor. And, a switching operation control circuit is connected between the coil and the clamp circuit for executing an turning-off operation of the switching element in accordance with a signal condition of the alternating-current signal received by the coil. In this case, the turning-off operation of the switching element is performed prior to the control of the clamp circuit.

Preferably, the switching operation control circuit executes the turning-off operation of the switching element in response to a change of amplitude modulation of the alternating-current signal received by the coil.

For example, the alternating-current signal received by the coil is an amplitude-modulated signal changeable up to 100% in the degree of amplitude modulation. In this case, the switching operation control circuit executes the turning-off operation of the switching element in response to 100% amplitude modulation of the alternating-current signal received by the coil.

Preferably, the clamp circuit is an analog circuit and the switching operation control circuit is a digital circuit.

According to the preferred embodiments of the present invention, the direct-current power supply circuit is incorporated in an IC card to or from which information is written or read, and the constant voltage produced by the clamp circuit is used to activate a semiconductor integrated circuit accommodated in the IC card.

Moreover, the present invention provides a third direct-current supply circuit comprising a coil for receiving an alternating-current signal from the outside of the direct-current power supply circuit, a rectifying circuit for rectifying an output of the coil, a smoothing capacitor for smoothing an output of the rectifying circuit, and a clamp circuit for controlling a terminal voltage of the smoothing capacitor to a predetermined constant voltage. The clamp circuit includes an output transistor connected in parallel with the smoothing capacitor. Furthermore, the clamp circuit includes a short-circuit preventing circuit which prevents the output transistor from short-circuiting both ends of the smoothing capacitor when an electric potential difference between both ends of the coil is smaller than a predetermined value.

Preferably, the short-circuit preventing circuit forcibly turns off the output transistor when the electric potential difference between both ends of the coil is smaller than the predetermined value.

Preferably, the short-circuit preventing circuit comprises an auxiliary transistor connected in series with the output transistor. The auxiliary transistor and the output transistor are connected in parallel with the smoothing capacitor. And, the short-circuit preventing circuit turns off the auxiliary transistor when the electric potential difference between both ends of the coil is smaller than the predetermined value.

According to the preferred embodiments of the present invention, the direct-current power supply circuit is incorporated in an IC card to or from which information is written or read. The coil receives an amplitude-modulated signal for data communication through electromagnetic coupling with an external apparatus. And, the direct-current power supply circuit produces a power supply voltage for activating a semiconductor integrated circuit accommodated in the IC card.

Preferably, the short-circuit preventing circuit is a logic circuit.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Fundamental Arrangement

Non-contact cards can be used for telephone cards and commuter passes. One of these non-contact cards is an IC card which is capable of performing data communication with a reader/writer equipped with a signal transmitting/receiving apparatus. Through such data communication, the IC card can perform data read and write operations.

Figure 9A:
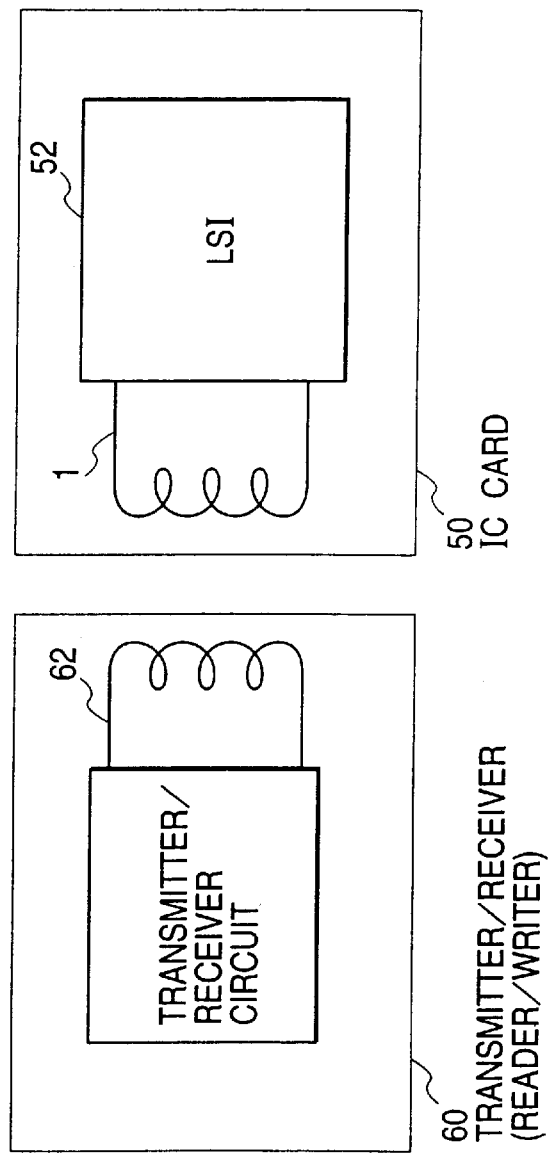
FIG. 9A is a schematic diagram illustrating the electromagnetic coupling between a transmitter/receiver and an IC card with a built-in DC power supply circuit.

FIG. 9A shows a schematic arrangement of an IC card 50 which includes a coil 1 and a semiconductor integrated circuit (LSI) 52. The coil 1 is a print pattern formed on an internal substrate of the IC card 50. The IC card 50 performs data communication with a reader/writer through the coil 1.

A transmitter/receiver 60, serving as the reader/writer, includes a coil 62 used for data communication. When IC card 50 is engaged with (for example, inserted in a slot of) the transmitter/receiver 60, electromagnetic coupling is formed between the coils 1 and 62 to read and write the information from and to the IC card 50. Namely, the data communication is performed through electromagnetic induction between the coils 1 and 62.

Figure 9B:
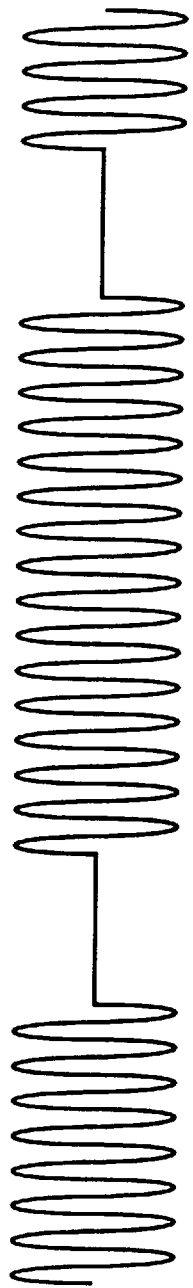
FIG. 9B is a transmission signal sent from the transmitter/receiver.

FIG. 9B shows an amplitude-modulated signal sent from the coil 62 to the coil 1 when the transmitter/receiver 60 transmits commands and data to the IC card 50. This amplitude-modulated signal is formed by modulating the amplitude of a communication carrier (100% modulation) with the transmitting data (1, 0).

The data transmission from the IC card 50 to the transmitter/receiver 60 is performed in the following manner.

For example, the transmitter/receiver 60 sends a carrier (non-modulated wave) to the coil 1. This carrier is amplitude-modulated (e.g., 15% modulation) with transmission data. Thus, part of the carrier being amplitude-modulated in accordance wit the transmission data from IC card 50 is returned to the coil 62 of the transmitter/receiver 60.

Figure 10:
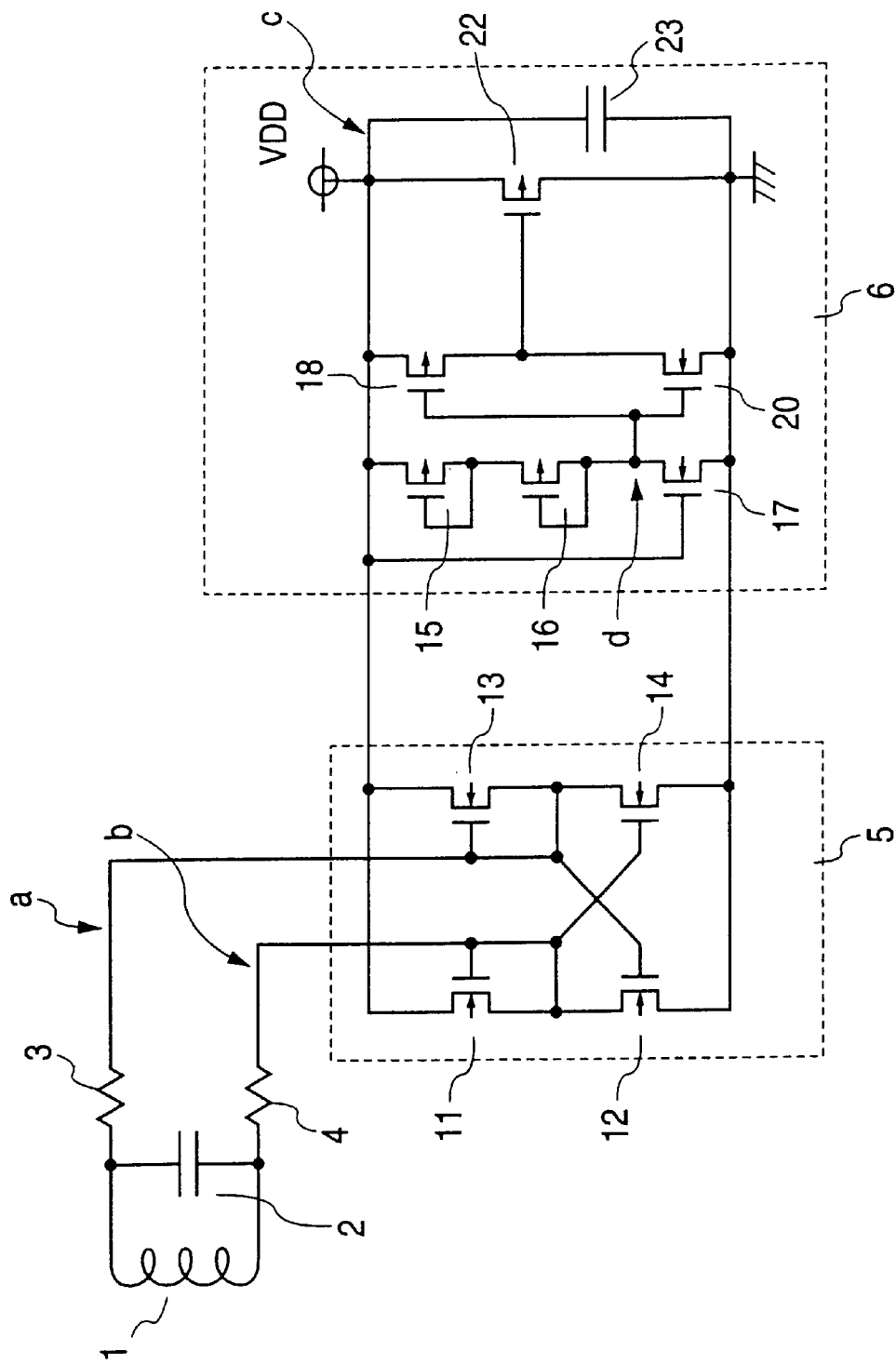
FIG. 10 is a diagram showing a fundamental circuit arrangement of a direct-current power supply circuit.

In general, the non-contact card has no power supply terminal. FIG. 10 shows a circuit arrangement of a DC power supply circuit, serving as part of the semiconductor integrated circuit 52 incorporated in the IC card 50, for producing a DC constant voltage.

As shown in FIG. 10, the coil 1 is connected in parallel with a resonant capacitor 2. The coil 1 and the resonant capacitor 2 cooperatively constitute a resonance circuit. Both ends of resonant capacitor 2 (i.e., both ends of coil 1) are connected to a full-wave rectifying circuit 5 via protective resisters 3 and 4. In the following explanation, node "a" represents a connecting point of the protective resister 3 and the full-wave rectifying circuit 5. Node "b" represents a connecting point of the protective resister 4 and the full-wave rectifying circuit 5.

The full-wave rectifying circuit 5 comprises a pair of N-channel metal oxide semiconductor field-effect transistors (each abbreviated Nch-MOSFET, hereinafter) 11 and 13. In respective Nch-MOSFETs 11 and 13, a drain terminal is connected to a positive electrode of a smoothing capacitor 23. The positive electrode of the smoothing capacitor 23 is referred to node "c" and is connected to a positive power supply line of the semiconductor integrated circuit 52.

In respective Nch-MOSFETs 11 and 13, a gate terminal and a source terminal are short-circuited. One end of the coil 1 is connected to the gate and source terminals of the Nch-MOSFET 13 via the protective resister 3. The other end of the coil 1 is connected to the gate and source terminals of the Nch-MOSFET 13 via the protective resister 4.

The full-wave rectifying circuit 5 comprises another pair of Nch-MOSFET 12 and 14. In respective Nch-MOSFETs 12 and 14, a source terminal is connected to a negative electrode of the smoothing capacitor 23. The negative electrode of the smoothing capacitor 23 is referred to GND (i.e., ground) terminal and is connected to a negative power supply line (so-called ground line) of the semiconductor integrated circuit 52.

The Nch-MOSFET 12 has a drain terminal connected to the source and gate terminals of the Nch-MOSFET 11. The Nch-MOSFET 12 has a gate terminal connected to the source and gate terminals of the Nch-MOSFET 13. The Nch-MOSFET 14 has a drain terminal connected to the source and gate terminals of the Nch-MOSFET 13. The Nch-MOSFET 14 has a gate terminal connected to the source and gate terminals of the Nch-MOSFET 11.

Figure 11:
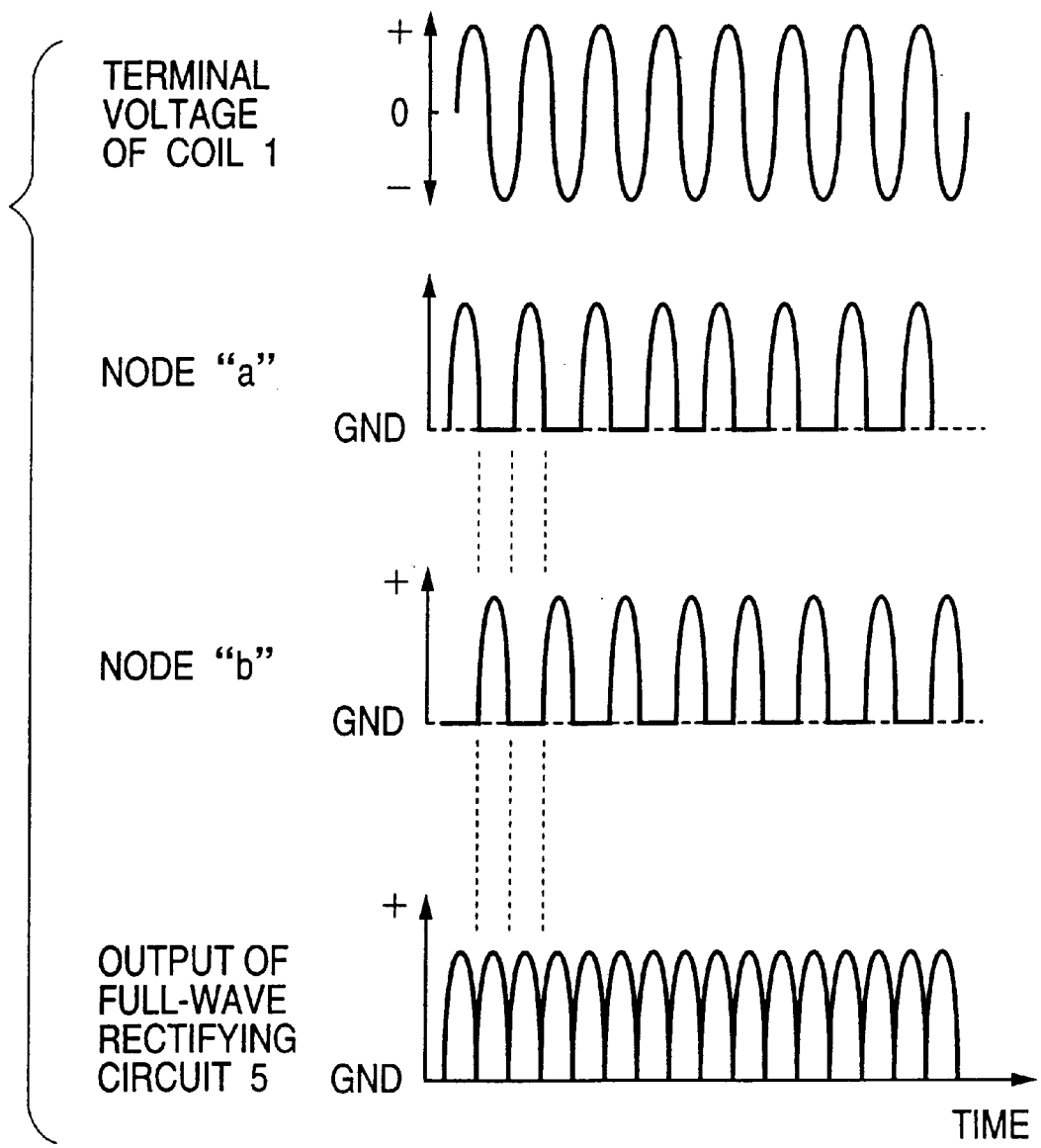
FIG. 11 is a time chart illustrating the operation of a full-wave rectifying circuit in the direct-current power supply circuit shown in FIG. 10.

The transmitter/receiver (reader/writer) 60 sends an alternating-current signal (i.e., carrier) to the coil 1. FIG. 11 shows the terminal voltage change of the coil 1 varying with a phase difference of 180°.

In the full-wave rectifying circuit 5, when the electric potential of the node "a" exceeds a threshold voltage of the Nch-MOSFET 12, the Nch-MOSFET 12 is turned on and the node "b" is grounded. On the contrary, when the electric potential of the node "b" exceeds a threshold voltage of the Nch-MOSFET 14, the Nch-MOSFET 14 is turned on and the node "a" is grounded.

When the Nch-MOSFET 12 is turned on, the gate terminal of Nch-MOSFET 14 is grounded and therefore the Nch-MOSFET 14 is turned off. On the other hand, when the Nch-MOSFET 14 is turned on, the gate terminal of Nch-MOSFET 12 is grounded and therefore the Nch-MOSFET 12 is turned off.

In each of Nch-MOSFETs 11 and 13, the gate and source terminals are short-circuited. Thus, each of Nch-MOSFETs 11 and 13 acts as a diode with an anode (i.e., the gate terminal) and a cathode (i.e., the drain terminal).

As a result, when the electric potential of the node "a" exceeds the threshold voltage of the Nch-MOSFET 13, current flows in the direction from the node "a" to the node "c" due to the diode function (i.e., gate-drain connection) of the Nch-MOSFET 13. On the other hand, when the electric potential of the node "b" exceeds the threshold voltage of the Nch-MOSFET 11, current flows in the direction from the node "b" to the node "c" due to the diode function (i.e., gate-drain connection) of the Nch-MOSFET 11.

Accordingly, the full-wave rectifying circuit 5 performs the full-wave rectifying operation for the alternating-current signal (i.e., carrier) transmitted from the transmitter/receiver 60 to the coil 1. The full-wave rectified current is supplied from the node "c" to the smoothing capacitor 23 to charge it up.

FIG. 11 shows an output waveform of the full-wave rectifying circuit 5 which is not connected to a clamp circuit 6. An actual circuit includes the clamp circuit 6 connected to the full-wave rectifying circuit 5. According to the actual circuit, the output waveform of the full-wave rectifying circuit 5 is smoothed by the smoothing capacitor 23 provided in the clamp circuit 6. Thus, it becomes possible to produce a substantially constant voltage with a negligible ripple component.

The clamp circuit 6 comprises an output transistor 22 connected in parallel with the smoothing capacitor 23. The output transistor 22 is constituted by a P-channel metal oxide semiconductor field-effect transistor (abbreviated Pch-MOSFET, hereinafter) which has a source terminal connected to the positive electrode (i.e., node "c") of the smoothing capacitor 23 and a drain terminal connected to the negative electrode (i.e., GND terminal) of the smoothing capacitor 23.

The clamp circuit 6 controls the gate voltage of the output transistor (i.e., Pch-MOSFET) 22 in accordance with the terminal voltage of the smoothing capacitor 22 so as to equalize the power supply voltage VDD with a preset voltage V0.

More specifically, the clamp circuit 6 comprises a plurality of Pch-MOSFETs 15, 16, 18 and Nch-MOSFETs 17 and 20. The Pch-MOSFET 15 has a source terminal connected to the node "c" and drain and gate terminals being short-circuited each other. The Pch-MOSFET 16 has a source terminal connected to the drain and gate terminals of Pch-MOSFET 15. The drain and gate terminals of the Pch-MOSFET 16 are short-circuited each other. The Nch-MOSFET 17 has a drain terminal connected to the drain and gate terminals of the Pch-MOSFET 16. The Nch-MOSFET 17 has a source terminal being grounded and a gate terminal being connected to the node "c." The Pch-MOSFET 18 has a source terminal connected to the node "c", a drain terminal connected to the gate terminal of the Pch-MOSFET 22, and a gate terminal connected to a connecting point (referred to a node "d") of the drain terminal of the Pch-MOSFET 16 and the drain terminal of the Nch-MOSFET 17. The Nch-MOSFET 20 has a source terminal being grounded, a drain terminal connected to a connecting point of the drain terminal of the Pch-MOSFET 18 and the gate terminal of the Pch-MOSFET 22, and a gate terminal connected to the node "d."

According to the arrangement of the clamp circuit 6, the smoothing capacitor 23 is charged by the current supplied from the full-wave rectifying circuit 5. When the terminal voltage of the smoothing capacitor 23 (i.e., the power supply voltage VDD) exceeds a threshold voltage of the Nch-MOSFET 17, the Nch-MOSFET 17 is turned on. An ON resistance (i.e., drain-source resistance) of Nch-MOSFET 17 becomes large in accordance with the transistor size.

The Pch-MOSFETs 15 and 16, provided between the drain terminal of the Nch-MOSFET 17 and the node "c", have the gate and drain terminals which are short-circuited. Thus, the Pch-MOSFETs 15 and 16 respectively act as a diode allowing current to flow in the forward direction from the node "c" to the Nch-MOSFET 17 due to the diode (source-gate) connection. Accordingly, the voltage level of the node "d" is lower than the terminal voltage (i.e., power supply voltage VDD) of the smoothing capacitor 23 by an amount equivalent to the forward-direction voltage of two diodes (i.e., a voltage drop at the Pch-MOSFETs 15 and 16).

When the voltage level of the node "d" is low, the Pch-MOSFET 18 turns on and the Nch-MOSFET 20 turns off. The gate voltage level of Pch-MOSFET 22 is maintained at a high level equivalent to that of the node "c." On the contrary, when the voltage level of the node "d" is high, the Pch-MOSFET 18 turns off and the Nch-MOSFET 20 turns on. The gate voltage level of Pch-MOSFET 22 is maintained at a low level equivalent to the ground (GND) potential.

Namely, the Pch-MOSFET 18 and the Nch-MOSFET 20 cooperatively act as an inverter having an input terminal (i.e., node "d") and an output terminal (i.e., gate terminal of Pch-MOSFET 22). When the electric potential of the node "d" is equal to or higher than the threshold voltage of this inverter, the gate potential of the Pch-MOSFET 22 decreases to turn on the Pch-MOSFET 22. When the electric potential of the node "d" is lower than the threshold voltage of this inverter, the gate potential of the Pch-MOSFET 22 increases to turn off the Pch-MOSFET 22.

When the Pch-MOSFET 22 is turned off, the smoothing capacitor 23 is charged by the current supplied from the full-wave rectifying circuit 5. The power supply voltage VDD increases. On the other hand, when the Pch-MOSFET 22 is turned on, the electric charge stored in the smoothing capacitor 23 is discharged through the Pch-MOSFET 22. The power supply voltage VDD decreases.

Accordingly, the clamp circuit 6 controls the gate voltage level of the output transistor (Pch-MOSFET) 22 to equalize the terminal voltage of the smoothing capacitor 23 with the preset voltage V0 (e.g., 5V). The preset voltage V0 is determined according to the transistor size of the Pch-MOSFET 18 and the Nch-MOSFET 20. Thus, the clamp circuit 6 has a function of adjusting the power supply voltage VDD to the preset voltage V0.

As described above, the clamp circuit 6 controls the output transistor (Pch-MOSFET) 22 connected in parallel with the smoothing capacitor 23. This circuit arrangement is advantageous in that the clamp circuit 6 is simply installable in the semiconductor integrated circuit (LSI) 52 of the IC card 50. More specifically, the clamp circuit 6 can be realized by using a Zener diode functioning in the same manner. However, if the clamp circuit 6 is constituted by a Zener diode, large current will flow across the Zener diode when an increased input voltage is applied to the clamp circuit 6 (for example, as disclosed in the Unexamined Japanese Patent Publication No. 64-55017). The output voltage of the full-wave rectifying circuit 5 serves as the input voltage of the clamp circuit 6. Hence, the Zener diode usable in this case must be large enough to assure satisfactory durability against a large current. However, it is generally difficult to incorporate such a large-scale electric component in the semiconductor integrated circuit (LSI).

As apparent from the foregoing description, the above-described DC power supply circuit, incorporated in a non-contact IC card, applies the full-wave rectification to the AC signal inputted through the coil 1, smooths the full-wave rectified signal by the smoothing capacitor 23 provided in the clamp circuit 6, and controls the DC voltage obtained through the smoothing operation within the preset voltage V0.

However, the coil 1 receives the amplitude modulated signal from the transmitter/receiver (i.e., reader/writer) 60. Thus, the AC signal entered from the nodes "a" and "b" to the full-wave-rectifying circuit 5 is not always a non-modulated carrier. For example, the input AC signal may have zero electric potential as a result of 100% amplitude modulation applied to the carrier.

When the 100% amplitude-modulated carrier signal is entered into the full-wave rectifying circuit 5, the full-wave rectifying circuit 5 produces no output. The smoothing capacitor 23 is not charged. In some cases, the full-wave rectifying circuit 5 may input the 100% amplitude modulated carrier signal after receiving a non-modulated carrier signal through the coil 1. In such cases, in response to the switching from the non-modulated carrier signal to the 100% amplitude-modulated carrier signal, the power supply voltage VDD decreases below the preset voltage V0 due to discharging of the smoothing capacitor 23 under the condition that the output transistor (Pch-MOSFET) 22 is turned on in the clamp circuit 6.

Figure 12:
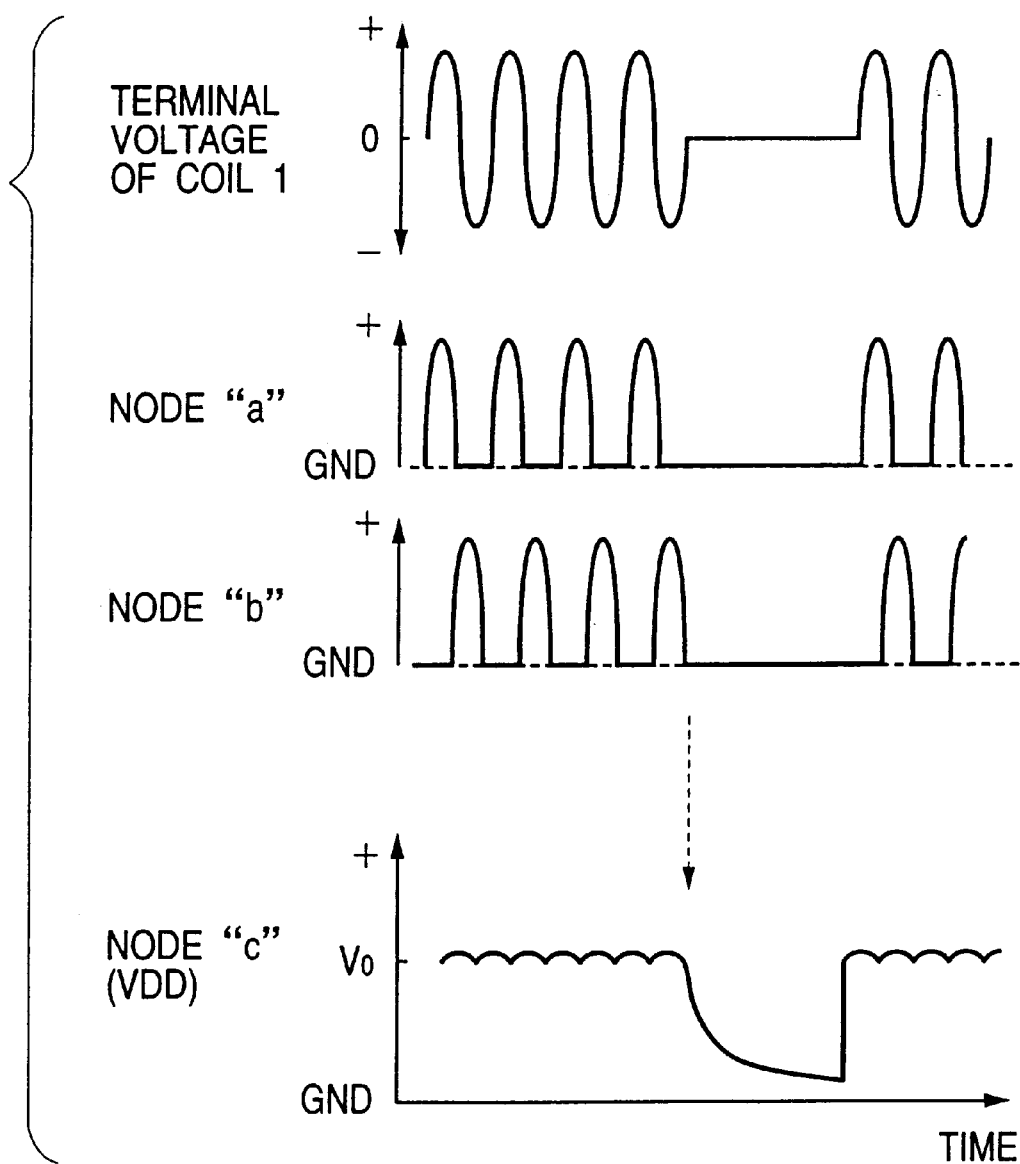
FIG. 12 is a time chart illustrating the operation of a clamp circuit in the direct-current power supply circuit shown in FIG. 10.

Furthermore, when the power supply voltage VDD decreases below the preset voltage V0, the electric potential of the node "d" becomes lower than a threshold voltage of the inverter constituted by the Pch-MOSFET 18 and the Nch-MOSFET 20 in the clamp circuit 6. This forces the output transistor (Pch-MOSFET) 22 to turn off. However, after the power supply voltage VDD is reduced, there is a significant time lag until the output transistor (Pch-MOSFET) 22 turns off via the Pch-MOSFETs 15, 16 and 18 and the Nch-MOSFET 20. During this time lag, the electric charge is discharged from the smoothing capacitor 23, while no electric power is supplied to the full-wave rectifying circuit 5. Hence, the electric potential (i.e., power supply voltage VDD) of the node "c" suddenly decreases as shown in FIG. 12.

When the power supply voltage VDD is decreased, it becomes impossible to charge the smoothing capacitor 23 by the output of the full-wave rectifying circuit 5 until the transmitter/receiver 60 again transmits a non-modulated carrier. During this time, the internal circuit of IC card 50 cannot operate normally.

Such a problem is not limited to the DC power supply circuit incorporated in a non-contact IC card. Similar problem will arise in a DC power supply circuit comprising a rectifying circuit and a smoothing capacitor for rectifying and smoothing an AC signal entered via a coil and a clamp circuit for clamping the terminal voltage of the smoothing capacitor within a preset voltage by controlling an output transistor connected in parallel with the smoothing capacitor.

In view of the foregoing, preferred embodiments of the present invention will be explained hereinafter with reference to attached drawings. Identical parts are denoted by the same reference numerals throughout the views.

First Embodiment

Figure 1:
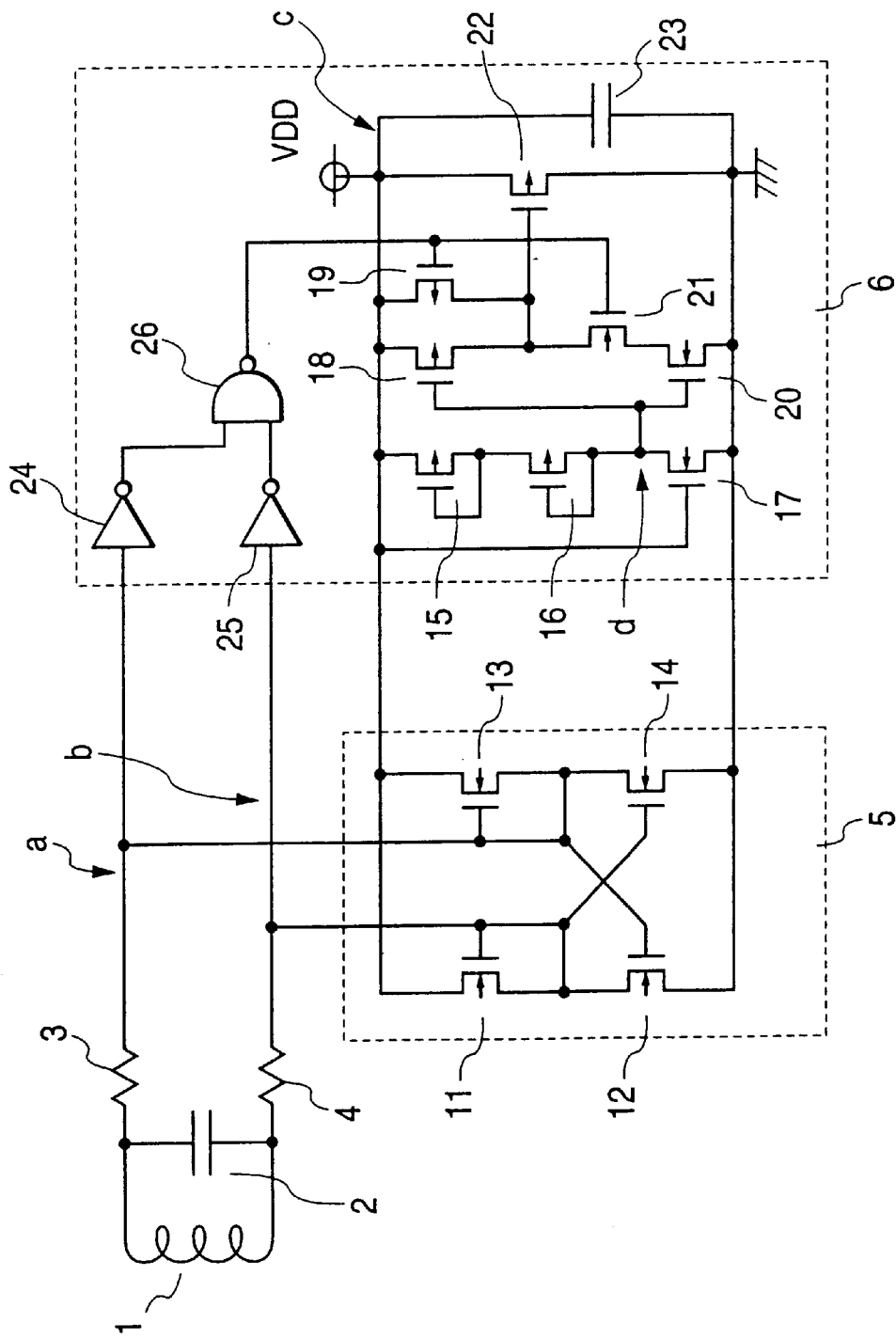
FIG. 1 is a diagram showing a circuit arrangement of a direct-current power supply circuit in accordance with a first embodiment of the present invention.

FIG. 1 shows a circuit arrangement of a direct-current power supply circuit in accordance with a first embodiment of the present invention.

The direct-current power supply circuit of the first embodiment serves as part of a semiconductor integrated circuit (LSI) 52 incorporated in a non-contact IC card 50 in the same manner as the circuit shown in FIG. 10.

A signal received by a communication coil 1 is full-wave rectified by a full-wave rectifying circuit 5. The rectified signal is smoothed by a smoothing capacitor 23. The terminal voltage of the smoothing capacitor 23 is controlled to a constant voltage by a clamp circuit 6, so as to produce a DC constant voltage (i.e., power supply voltage) VDD for actuating internal circuit components.

The direct-current power supply circuit of the first embodiment differs from the FIG. 10 circuit in the following features.

The clamp circuit 6 includes a short-circuit preventing circuit consisting of inverters 24,25, a NAND circuit 26, a Pch-MOSFET 19 and a Nch-MOSFET 21.

An input terminal of the inverter 24 is connected to the connecting point (node "a") of the protective resister 3 and the full-wave rectifying circuit 5. An input terminal of the inverter 25 is connected to the connecting point (node "b") of the protective resister 4 and the full-wave rectifying circuit 5. Output terminals of the inverters 24 and 25 are connected to two input terminals of the NAND circuit 26.

The Pch-MOSFET 19 has a source terminal connected to the positive electrode (node "c") of the smoothing capacitor 23, a drain terminal connected to the gate terminal of the output transistor (Pch-MOSFET) 22, and a gate terminal connected to an output terminal of the NAND circuit 26.

The Nch-MOSFET 21 is provided on a circuit pathway connecting the drain terminal of Pch-MOSFET 18 and the drain terminal of Nch-MOSFET 20. The Nch-MOSFET 21 has a drain terminal connected to the drain terminal of Pch-MOSFET 18, a source terminal connected to the drain terminal of Nch-MOSFET 20, and a gate terminal connected to the output terminal of NAND circuit 26.

The connecting point of the drain terminal of Nch-MOSFET 21 and the drain terminal of Pch-MOSFET 18 is connected to the gate terminal of Pch-MOSFET 22. The drain terminal of Nch-MOSFET 20 is connected to the source terminal of the Nch-MOSFET 21 and is not directly connected to the gate terminal of Pch-MOSFET 22.

According to the direct-current power supply circuit shown in FIG. 1, the NAND circuit 26 produces a Low-level output signal only when it inputs two High-level signals simultaneously. Otherwise, the NAND circuit 26 produces a High-level output signal. More specifically, the output signals of the inverters 24 and 25 are entered into the two input terminals of NAND circuit 26. When the electric potentials of the nodes "a" and "b" are lower than the threshold voltages of the inverters 24 and 25 respectively, both of inverters 24 and 25 produce High-level signals. Only in this condition, the NAND circuit 26 produces a Low-level output signal. Otherwise, the NAND circuit 26 produces a High-level output signal (refer to FIG. 2).

When the NAND circuit 26 produces a Low-level signal, the Pch-MOSFET 19 turns on and the Nch-MOSFET 21 turns off. Thus, the Pch-MOSFET 22 is forcibly turned off even when the Pch-MOSFET 18 turns off and the Nch-MOSFET 20 turns on so as to turn on the Pch-MOSFET 22.

Namely, in the clamp circuit 6 of the first embodiment, the Pch-MOSFET 18, Pch-MOSFET 19, Nch-MOSFET 20, and Nch-MOSFET 21 cooperatively act as a NAND gate circuit having an input terminal connected to the node "d" and another input terminal connected to the output terminal of NAND circuit 26. An output terminal of this NAND gate circuit is connected to the gate of the Pch-MOSFET 22.

When the electric potential of the node "d" is equal to or higher than a threshold voltage of this NAND gate circuit, and further when the NAND circuit 26 produces a High-level signal, the gate terminal of the Pch-MOSFET 22 has a Low-level electric potential. Thus, the Pch-MOSFET 22 is turned on.

On the other hand, when the electric potential of the node "d" is lower than the threshold voltage of this NAND gate circuit, or when the NAND circuit 26 produces a Low-level signal, the gate terminal of the Pch-MOSFET 22 has a High-level electric potential. Thus, the Pch-MOSFET 22 is turned off.

As described above, the coil 1 receives an amplitude-modulated signal through the electromagnetic coupling with the transmitter/receiver (i.e., reader/writer) 60. The above-described direct-current power supply circuit of the first embodiment uses the inverters 24 and 25 and the NAND circuit 26 to promptly detect the switching of the input signal from the non-modulated carrier signal to the 100% amplitude-modulated carrier signal. The output transistor (Pch-MOSFET) 22 is forcibly turned off when such a sudden change is detected.

Figure 2:
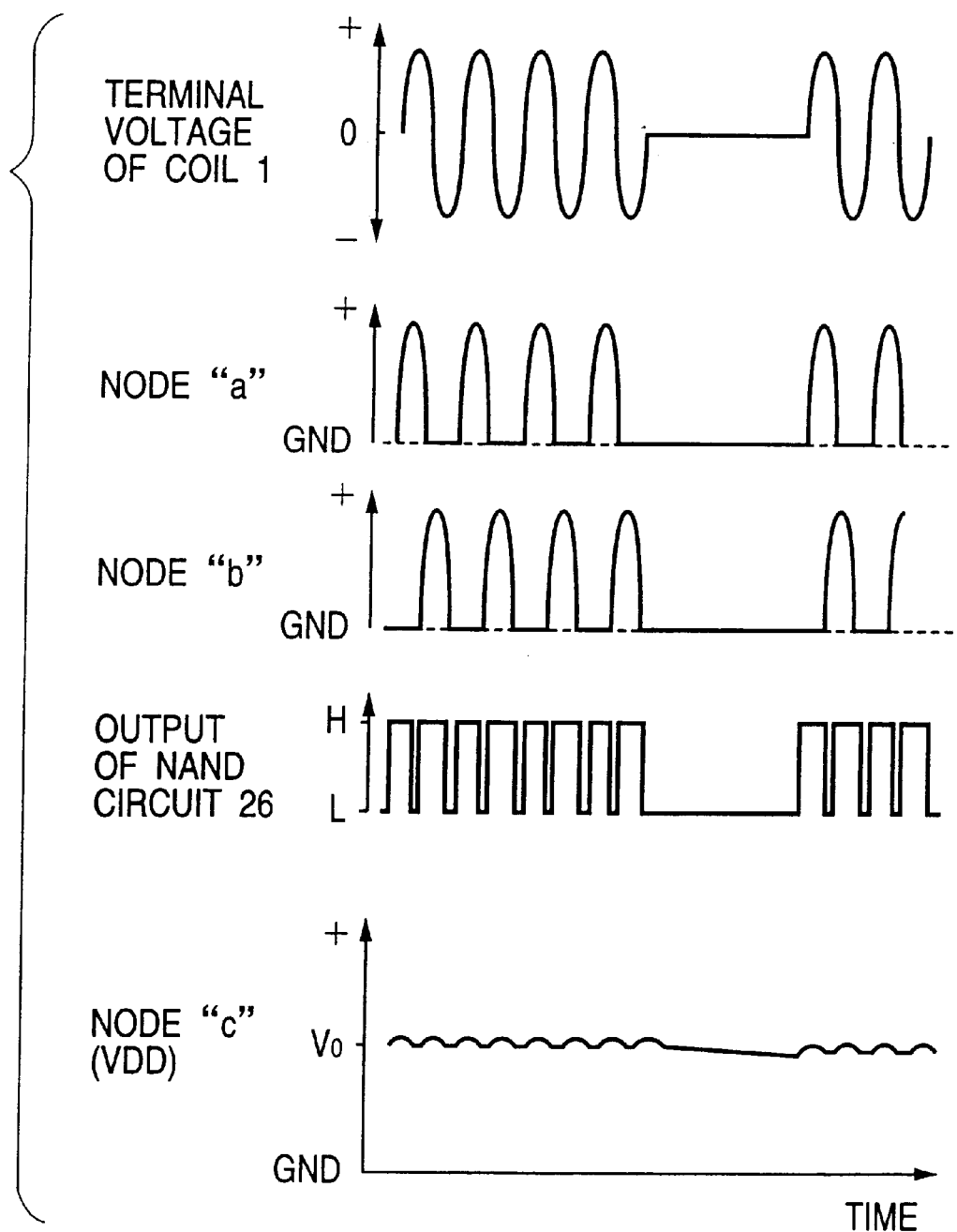
FIG. 2 is a time chart illustrating the operation of a clamp circuit provided in the direct-current power supply circuit in accordance with the first embodiment of the present invention.

Accordingly, as shown in FIG. 2, it becomes possible to prevent the smoothing capacitor 23 from discharging the electric charge unnecessarily regardless the modulated condition of the amplitude-modulated signal sent from the transmitter/receiver 60. In other words, it becomes possible to prevent the power supply voltage VDD from suddenly decreasing. Therefore, the first embodiment of the present invention provides a direct-current power supply circuit capable of stabilize the power voltage applied to the internal components in the IC card 50.

For example, when two or more laminated or stacked IC cards are simultaneously inserted in the reader/writer, or when the IC card is placed far from the reader/writer, or when the mutual position of the IC card and the reader/writer is incorrectly set, an obtainable electromagnetic induction will be weak unsatisfactory. The coil 1 will produce an output signal with a small amplitude. In such a case, the power supply voltage VDD may become lower than the preset voltage V0 (e.g., 5V).

However, in this case, the electric potential of the node "d" becomes lower than the threshold voltage of the NAND gate circuit constituted by the Pch-MOSFETs 18 and 19 and the Nch-MOSFETs 20 and 21. Thus, the Pch-MOSFET 22 turns off. No electric charge is discharged from the smoothing capacitor 23. The power supply voltage VDD is maintained adequately.

When the coil 1 receives the 100% amplitude-modulated signal in this condition, the NAND circuit 26 produces a Low-level signal so as to turn off the Pch-MOSFET 22. However, the Pch-MOSFET 22 is already turned off in this condition. Thus, the condition of the Pch-MOSFET 22 does not change in response to the input of the 100% amplitude-modulated signal through the coil 1 due to electromagnetic induction.

Second Embodiment

Figure 3:
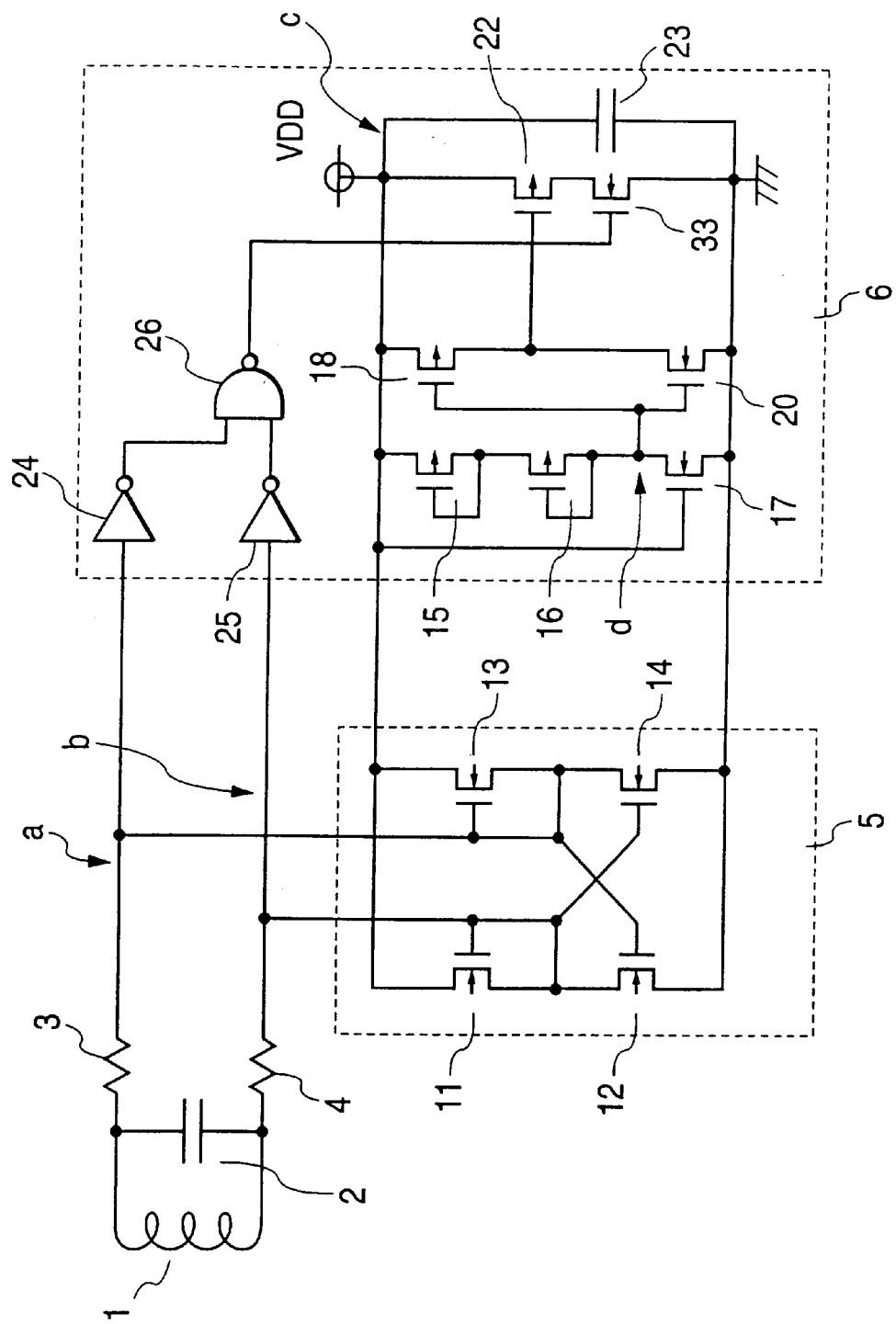
FIG. 3 is a diagram showing a circuit arrangement of a direct-current power supply circuit in accordance with a second embodiment of the present invention.

FIG. 3 shows a circuit arrangement of a direct-current power supply circuit in accordance with a second embodiment of the present invention.

The direct-current power supply circuit of the second embodiment differs from the FIG. 10 circuit in that the clamp circuit 6 includes a short-circuit preventing circuit consisting of inverters 24, 25, a NAND circuit 26, and a Nch-MOSFET 33 interposed between the drain terminal of Pch-MOSFET 22 and the ground (GND) terminal.

The Nch-MOSFET 33 has a drain terminal connected to the drain terminal of Pch-MOSFET 22, a source terminal connected to the ground (GND) terminal, and a gate terminal connected to the output terminal of the NAND circuit 26.

According to the direct-current power supply circuit of the second embodiment, the NAND circuit 26 produces a Low-level output signal when the voltage potential difference between the both ends of the coil 1 is smaller than a predetermined value close to zero. The Nch-MOSFET 33 turns off in response to the Low-level output signal of the NAND circuit 26. Accordingly, even when the Pch-MOSFET 22 is turned on by the Pch-MOSFETs 15, 16 and 18 and the Nch-MOSFETs 17 and 20, the Nch-MOSFET 33 forcibly shuts the discharging path (i.e., opens a discharging circuit) of the smoothing capacitor 23. Thus, the second embodiment of the present invention effectively prevents the power supply voltage VDD from decreasing when the voltage potential difference between the ends of the coil 1 is smaller than the predetermined value close to zero.

Third Embodiment

Figure 4:
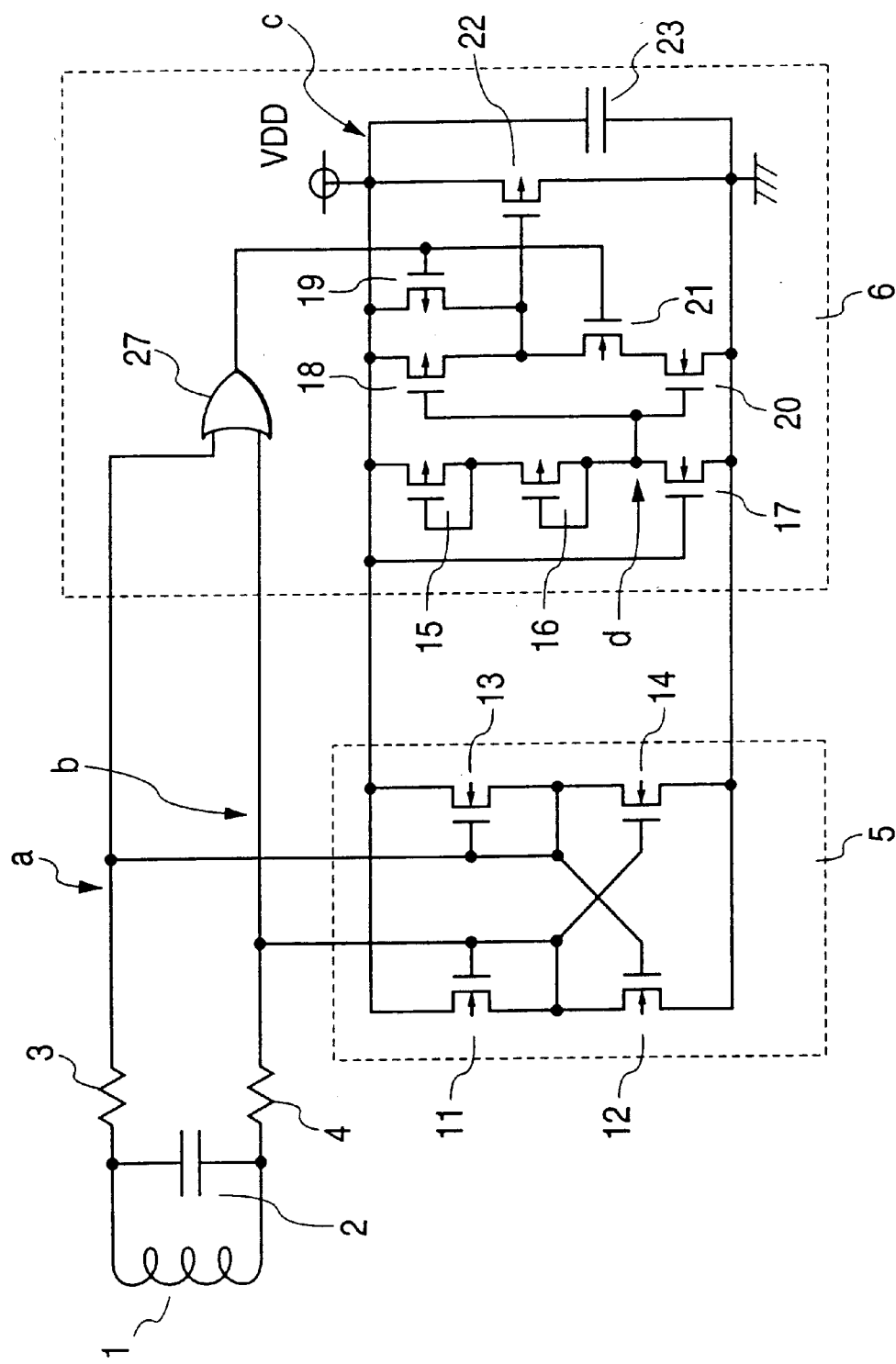
FIG. 4 is a diagram showing a circuit arrangement of a direct-current power supply circuit in accordance with a third embodiment of the present invention.

FIG. 4 shows a circuit arrangement of a direct-current power supply circuit in accordance with a third embodiment of the present invention.

The direct-current power supply circuit of the third embodiment differs from the FIG. 1 circuit in that the inverters 24 and 25 and the NAND circuit 26 are replaced with an OR circuit 27.

The OR circuit 27 produces a High-level output signal when at least one of two input terminals receives a High-level input signal having an electric potential equal to or higher than the threshold voltage of the OR circuit 27. The OR circuit 27 produces a Low-level output signal when each input terminal receives a Low-level input signal having an electric potential lower than the threshold voltage of the OR circuit 27.

Accordingly, the two input terminals of the OR circuit 27 are connected to the nodes "a" and "b", respectively. The output terminal of the OR circuit 27 is connected to the gate terminals of the Pch-MOSFET 19 and the Nch-MOSFET 21. Thus, the third embodiment functions substantially the same manner and brings substantially the same effects as the first embodiment.

Although not shown in the drawing, the circuit arrangement of the second embodiment shown in FIG. 3 can be modified in the same manner. Namely, it is also preferable to connect the output terminal of the OR circuit 27 to the gate terminal of the Nch-MOSFET 33. Thus, the third embodiment functions substantially the same manner and brings substantially the same effects as the second embodiment.

Fourth Embodiment

Figure 5:
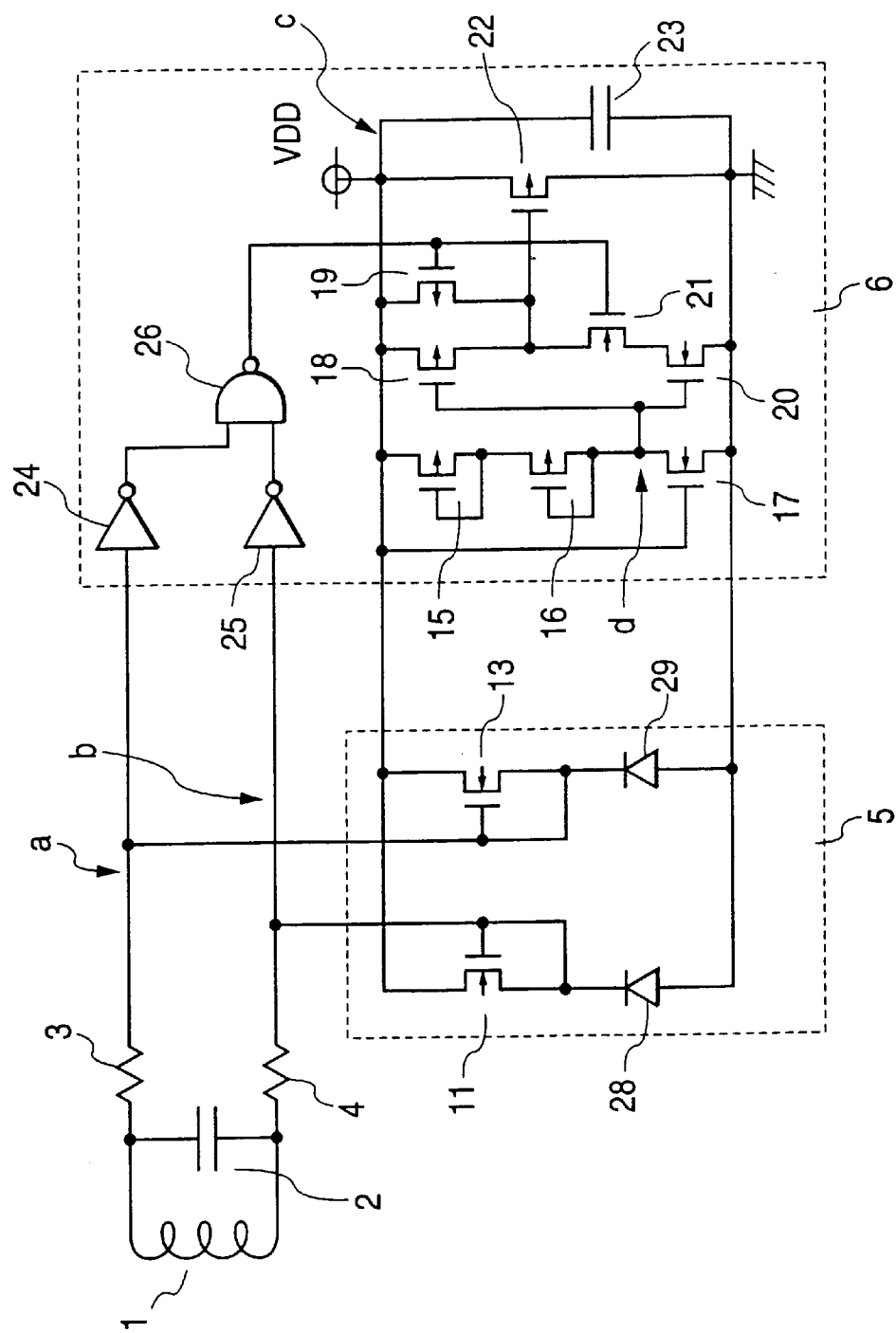
FIG. 5 is a diagram showing a circuit arrangement of a direct-current power supply circuit in accordance with a fourth embodiment of the present invention.

FIG. 5 shows a circuit arrangement of a direct-current power supply circuit in accordance with a fourth embodiment of the present invention.

The direct-current power supply circuit of the fourth embodiment differs from the FIG. 1 circuit in that the full-wave rectifying circuit 5 is modified.

More specifically, the full-wave rectifying circuit 5 of the fourth embodiment includes the Nch-MOSFETs 11 and 13, each having short-circuited gate and source terminals, acting as a diode as described above. Furthermore, the full-wave rectifying circuit 5 of the fourth embodiment comprises two diodes 28 and 29. The diode 28 has an anode connected to the ground terminal and a cathode connected to the short-circuited gate and source terminals of the Nch-MOSFET 11. The diode 29 has an anode connected to the ground terminal and a cathode connected to the short-circuited gate and source terminals of the Nch-MOSFET 13.

As a result, the circuit arrangement of the full-wave rectifying circuit 5 of the fourth embodiment is equivalent to a general diode bridge consisting of four diodes. Each diode (i.e., Nch-MOSFETs 11 and 13 and diodes 28 and 29) of the full-wave rectifying circuit 5 operates for full-wave rectifying the input signal entered through the coil 1.

Fifth Embodiment

Figure 6:
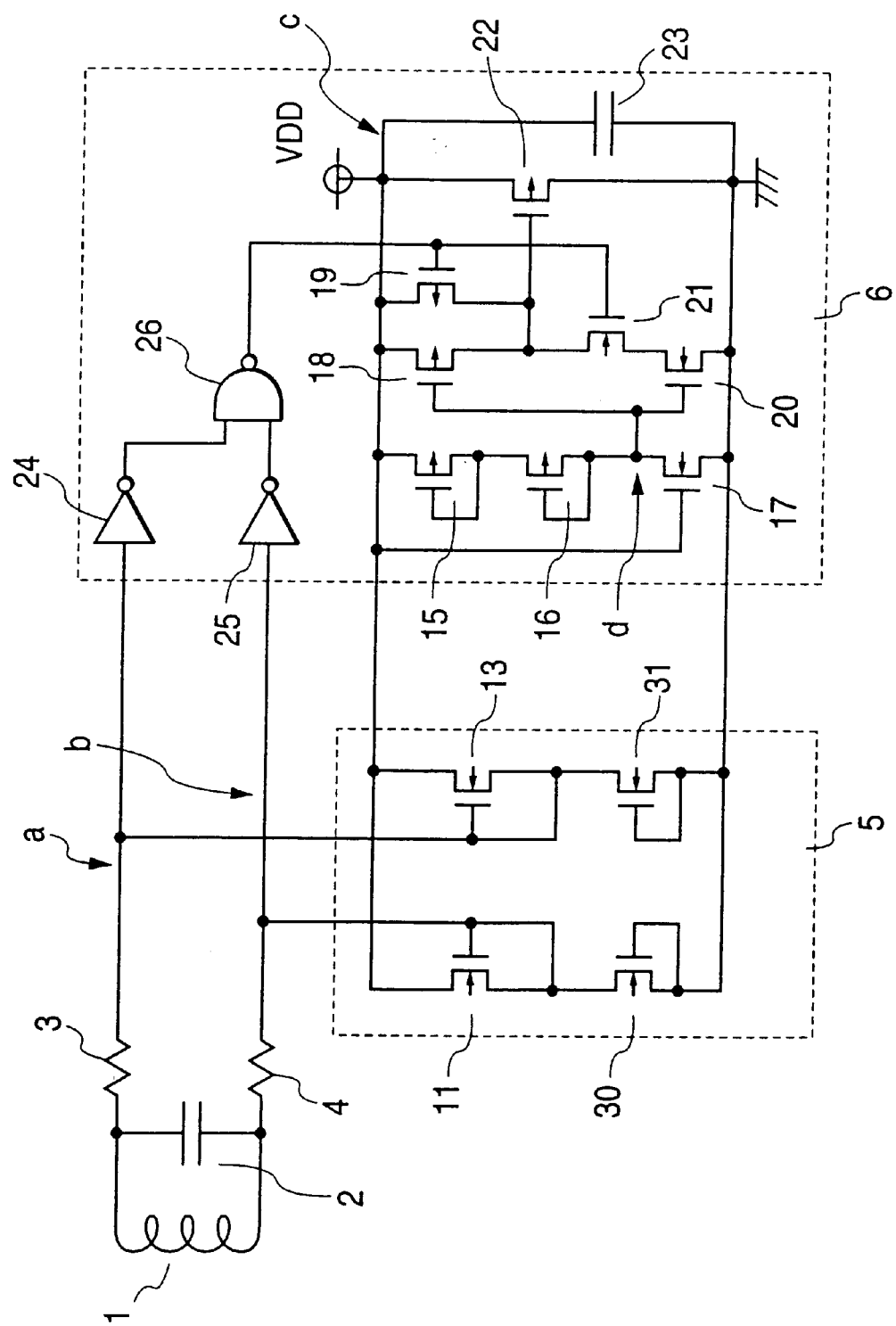
FIG. 6 is a diagram showing a circuit arrangement of a direct-current power supply circuit in accordance with a fifth embodiment of the present invention.

FIG. 6 shows a circuit arrangement of a direct-current power supply circuit in accordance with a fifth embodiment of the present invention.

The direct-current power supply circuit of the fifth embodiment differs from the FIG. 1 circuit in that the full-wave rectifying circuit 5 is modified.

More specifically, the full-wave rectifying circuit 5 of the fifth embodiment includes the Nch-MOSFETs 11 and 13, each having short-circuited gate and source terminals, acting as a diode as described above. Furthermore, the full-wave rectifying circuit 5 of the fifth embodiment comprises a pair of Nch-MOSFETs 30 and 31. The Nch-MOSFET 30 has a drain terminal connected to the short-circuited gate and source terminals of the Nch-MOSFET 11. The gate and source terminals of the Nch-MOSFET 30 are short-circuited and connected to the ground (GND) terminal. The Nch-MOSFET 31 has a drain terminal connected to the short-circuited gate and source terminals of the Nch-MOSFET 13. The gate and source terminals of the Nch-MOSFET 31 are short-circuited and connected to the ground (GND) terminal. Namely, each of Nch-MOSFETs 11, 13, 30 and 31 functions as a diode.

As a result, the circuit arrangement of the full-wave rectifying circuit 5 of the fifth embodiment is equivalent to a general diode bridge consisting of four diodes. Each diode (i.e., Nch-MOSFETs 11, 13, 30 and 31) of the full-wave rectifying circuit 5 operates for full-wave rectifying the input signal entered through the coil 1.

Sixth Embodiment

Figure 7:
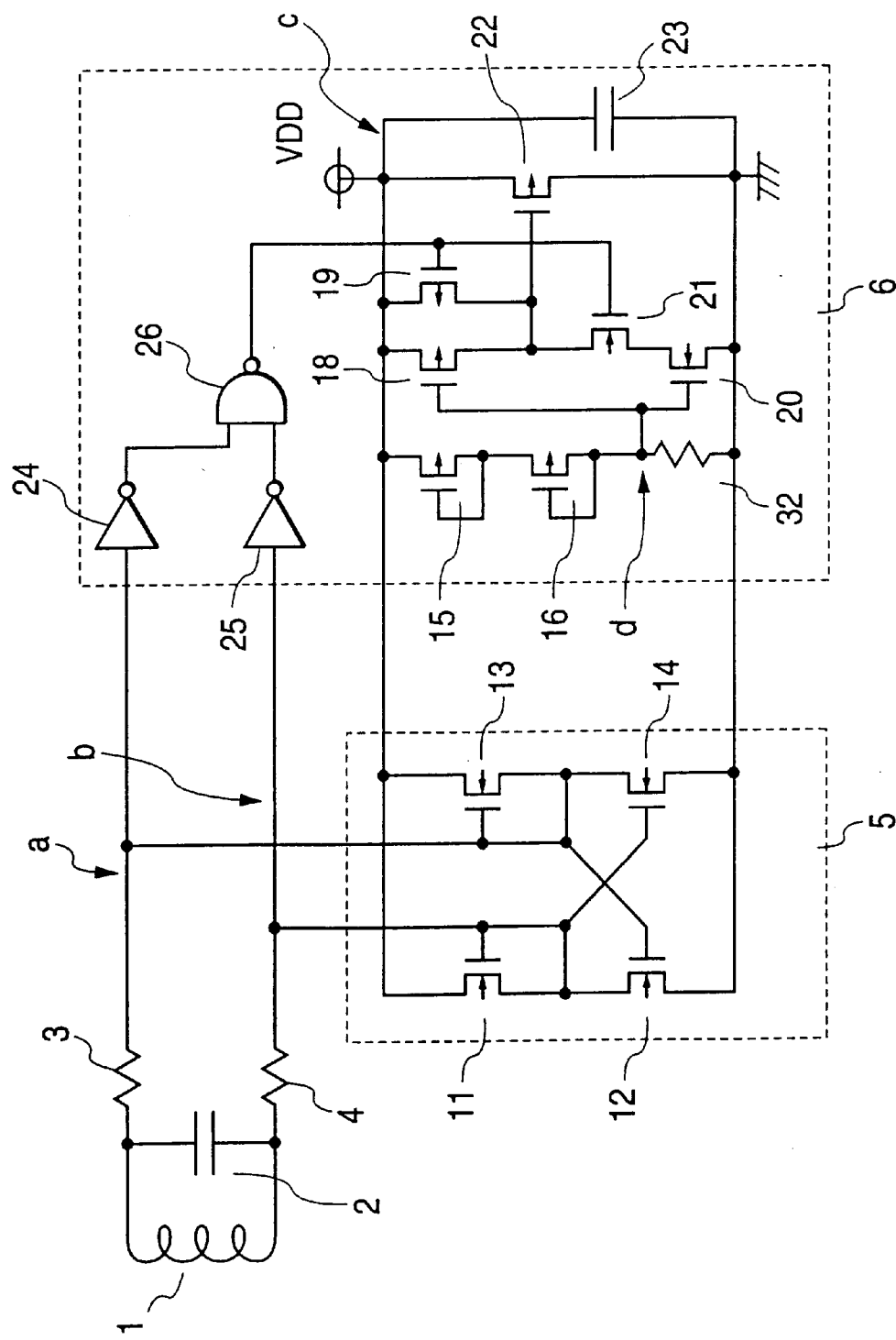
FIG. 7 is a diagram showing a circuit arrangement of a direct-current power supply circuit in accordance with a sixth embodiment of the present invention.

FIG. 7 shows a circuit arrangement of a direct-current power supply circuit in accordance with a sixth embodiment of the present invention.

The direct-current power supply circuit of the sixth embodiment differs from the FIG. 1 circuit in that the Nch-MOSFET 17 is replaced with a resister 32 in the clamp circuit 6.

An electric potential between the both ends of the resister 32 is equivalent to a value obtained by subtracting the forward-directional electric potential of the diode (i.e., Pch-MOSFETs 15 and 16) from the power supply voltage VDD (i.e., electric potential of node "c"). Thus, the resister 32 functions in the same manner as the Nch-MOSFET 17.

Seventh Embodiment

Figure 8:
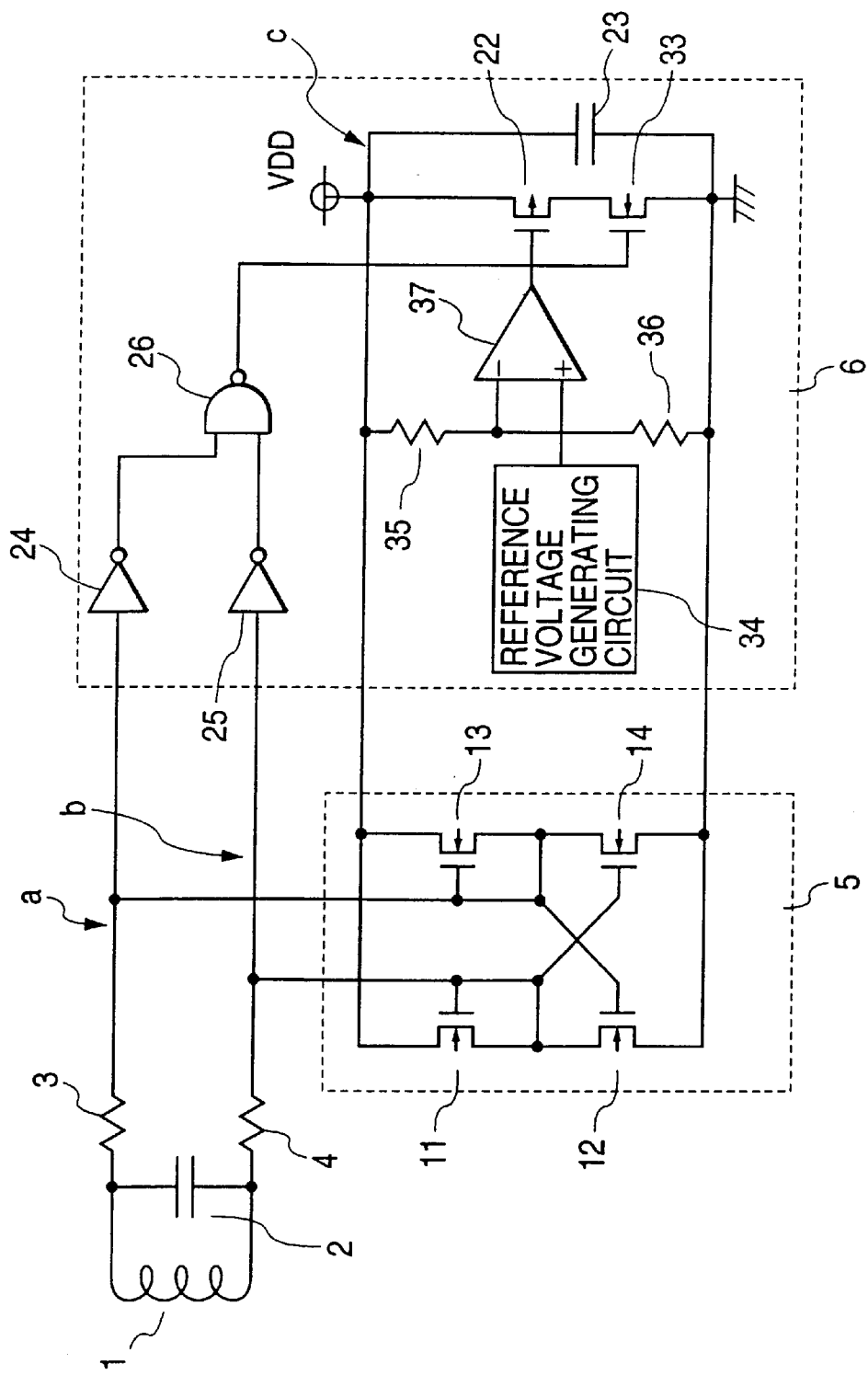
FIG. 8 is a diagram showing a circuit arrangement of a direct-current power supply circuit in accordance with a seventh embodiment of the present invention.

FIG. 8 shows a circuit arrangement of a direct-current power supply circuit in accordance with a seventh embodiment of the present invention.

The direct-current power supply circuit of the seventh embodiment differs from the FIG. 3 circuit in that the clamp circuit 6 is modified.

More specifically, the MOSFETs 15, 16, 17, 18 and 20 are replaced by a reference voltage generating circuit 34, a pair of resisters 35 and 36, and a comparator 37. The reference voltage generating circuit 34 produced a predetermined reference voltage. The resisters 35 and 36 are serially connected between the both ends of the smoothing capacitor 23 so as to function as a voltage divider. Thus, an electric potential of the connecting point of resisters 35 and 36 is proportional to the terminal voltage of the smoothing capacitor 23. The comparator 37 has two input terminals. One input terminal of the comparator 37 receives the reference voltage produced from the reference voltage generating circuit 34. The other input terminal of the comparator 37 receives a detected voltage obtained from the connecting point of resisters 35 and 36 which represents the terminal voltage of smoothing capacitor 23.

When the detected voltage is larger than the reference voltage, the comparator 37 produces a Low-level signal. The Pch-MOSFET 22 turns on in response to the Low-level signal of the comparator 37. When the detected voltage is equal to or smaller than the reference voltage, the comparator 37 produces a High-level signal. The Pch-MOSFET 22 turns off in response to the High-level signal of the comparator 37.

With this arrangement, the clamp circuit 6 of the seventh embodiment controls the terminal voltage of the smoothing capacitor 23 to the preset voltage V0.

OTHER MODIFICATIONS

The above-described embodiments disclose full-wave rectifying circuits for rectifying an alternating-current signal entered through the coil 1. However, the present invention is not limited to the full-wave rectifying circuit. Therefore, the full-wave rectifying circuit can be replaced by a half-wave rectifying circuit.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A direct-current power supply circuit comprising:
   a signal receiving section for receiving an alternating-current signal from outside of the direct-current power supply circuit;
   a rectifying section for rectifying an output of said signal receiving section;
   a smoothing section for smoothing an output of said rectifying section;
   a first control section for controlling the operation of a switching section to produce a constant voltage, said switching section changing the voltage level of an output of said smoothing section; and
   a second control section, connected between said signal receiving section and said first control section, for prohibiting the switching operation of said switching section in accordance with a signal condition of the alternating-current signal received by said signal receiving section, the prohibition of the second control section having priority over the control of said first control section.

2. The direct-current power supply circuit in accordance with claim 1, wherein said second control section prohibits the switching operation of said switching section in response to a change of amplitude modulation of said alternating-current signal received by said signal receiving section.

3. The direct-current power supply circuit in accordance with claim 2, wherein said first control section is an analog circuit and said second control section is constituted primarily by a digital circuit.

4. The direct-current power supply circuit in accordance with claim 3, wherein
   the direct-current power supply circuit is incorporated in an IC card to or from which information is written or read, and
   wherein the constant voltage produced by said first control section is used to activate a semiconductor integrated circuit incorporated in said IC card.

5. The direct-current power supply circuit in accordance with claim 1, wherein
   the alternating-current signal received by said signal receiving section is an amplitude-modulated signal changeable up to 100% in the degree of amplitude modulation, and
   wherein said second control section prohibits the switching operation of said switching section in response to the change of the amplitude modulation of said alternating-current signal received by said signal receiving section.

6. The direct-current power supply circuit in accordance with claim 5, wherein said first control section is an analog circuit and said second control section is constituted primarily by a digital circuit.

7. The direct-current power supply circuit in accordance with claim 6, wherein
   the direct-current power supply circuit is incorporated in an IC card to or from which information is written or read, and
   wherein the constant voltage produced by said first control section is used to activate a semiconductor integrated circuit incorporated in said IC card.

8. A direct-current power supply circuit comprising:
   a coil for receiving an alternating-current signal from outside of the direct-current power supply circuit;
   a rectifying circuit for rectifying an output of said coil;
   a capacitor for smoothing an output of said rectifying circuit;
   a clamp circuit for controlling the operation of a switching element to produce a constant voltage, said switching element controlling the charging and discharging operations of said capacitor; and
   a switching operation control circuit, connected between said coil and said clamp circuit, for executing an turning-off operation of said switching element in accordance with a signal condition of the alternating-current signal received by said coil, said turning-off operation of said switching element having priority over the control of said clamp circuit.

9. The direct-current power supply circuit in accordance with claim 8, wherein said switching operation control circuit executes the turning-off operation of said switching element in response to a change of amplitude modulation of said alternating-current signal received by said coil.

10. The direct-current power supply circuit in accordance with claim 9, wherein said clamp circuit is an analog circuit and said switching operation control circuit is constituted primarily by a digital circuit.

11. The direct-current power supply circuit in accordance with claim 10, wherein
    the direct-current power supply circuit is incorporated in an IC card to or from which information is written or read, and
    wherein the constant voltage produced by said clamp circuit is used to activate a semiconductor integrated circuit incorporated in said IC card.

12. The direct-current power supply circuit in accordance with claim 8, wherein
    the alternating-current signal received by said coil is an amplitude-modulated signal changeable up to 100% in degree of amplitude modulation, and
    wherein said switching operation control circuit executes the turning-off operation of said switching element in response to the change of the amplitude modulation of said alternating-current signal received by said coil.

13. The direct-current power supply circuit in accordance with claim 12, wherein said clamp circuit is an analog circuit and said switching operation control circuit is constituted primarily by a digital circuit.

14. The direct-current power supply circuit in accordance with claim 13, wherein
    the direct-current power supply circuit is incorporated in an IC card to or from which information is written or read, and
    wherein the constant voltage produced by said clamp circuit is used to activate a semiconductor integrated circuit incorporated in said IC card.

15. A direct-current power supply circuit comprising:
    a coil for receiving an alternating-current signal from the outside of the direct-current power supply circuit;
    a rectifying circuit for rectifying an output of said coil;
    a smoothing capacitor for smoothing an output of said rectifying circuit; and
    a clamp circuit for controlling a terminal voltage of said smoothing capacitor to a predetermined constant voltage, said clamp circuit including an output transistor connected in parallel with said smoothing capacitor;

wherein said clamp circuit includes a short-circuit preventing circuit which prevents said output transistor from short-circuiting both ends of said smoothing capacitor when an electric potential difference between both ends of said coil is smaller than a predetermined value.

16. The direct-current power supply circuit in accordance with claim 15, wherein the direct-current power supply circuit is incorporated in an IC card to or from which information is written or read, said coil receives an amplitude-modulated signal for data communication through electromagnetic coupling with an external apparatus, and said direct-current power supply circuit produces a power supply voltage for activating a semiconductor integrated circuit accommodated in said IC card.

17. The direct-current power supply circuit in accordance with claim 15, wherein said short-circuit preventing circuit is a logic circuit.

18. The direct-current power supply circuit in accordance with claim 15, wherein said short-circuit preventing circuit forcibly turns off said output transistor when the electric potential difference between both ends of said coil is smaller than the predetermined value.

19. The direct-current power supply circuit in accordance with claim 18, wherein the direct-current power supply circuit is incorporated in an IC card to or from which information is written or read, said coil receives an amplitude-modulated signal for data communication through electromagnetic coupling with an external apparatus, and said direct-current power supply circuit produces a power supply voltage for activating a semiconductor integrated circuit accommodated in said IC card.

20. The direct-current power supply circuit in accordance with claim 18, wherein said short-circuit preventing circuit is a logic circuit.

21. The direct-current power supply circuit in accordance with claim 15, wherein said short-circuit preventing circuit comprises an auxiliary transistor connected in series with said output transistor, and said auxiliary transistor and said output transistor are connected in parallel with said smoothing capacitor, and said short-circuit preventing circuit turns off said auxiliary transistor when the electric potential difference between both ends of said coil is smaller than the predetermined value.

22. The direct-current power supply circuit in accordance with claim 21, wherein the direct-current power supply circuit is incorporated in an IC card to or from which information is written or read, said coil receives an amplitude-modulated signal for data communication through electromagnetic coupling with an external apparatus, and said direct-current power supply circuit produces a power supply voltage for activating a semiconductor integrated circuit accommodated in said IC card.

23. A direct-current power supply circuit comprising:

a signal receiving section for receiving an amplitude modulated alternating-current signal from outside of the direct-current power supply circuit;

a rectifying section for rectifying an output of said signal receiving section;

a smoothing section for smoothing an output of said rectifying section;

a first control section for controlling operation of a switching section to produce a constant voltage, said switching section changing the voltage level of an output of said smoothing section; and a second control section connected between said signal receiving section and said first control section to directly detect said amplitude modulated alternating-current signal from said signal receiving section, said second control section prohibiting the switching operation of said switching section in accordance with a signal condition of detected amplitude modulated alternating-current signal, the prohibition of the second control section having priority over the control of said first control section.

24. The direct-current power supply circuit in accordance with claim 23, wherein said second control section prohibits the switching operation of said switching section in response to a change of amplitude modulation of said alternating-current signal received by said signal receiving section.

25. The direct-current power supply circuit in accordance with claim 24, wherein said first control section is an analog circuit and said second control section is constituted primarily by a digital circuit.

26. The direct-current power supply circuit in accordance with claim 25, wherein the direct-current power supply circuit is incorporated in an IC card to or from which information is written or read, and wherein the constant voltage produced by said first control section is used to activate a semiconductor integrated circuit incorporated in said IC card.

27. The direct-current power supply circuit in accordance with claim 23, wherein said amplitude modulated alternating-current signal received by said signal receiving section is changeable up to 100% in degree of amplitude modulation, and wherein said second control section prohibits the switching operation of said switching section in response to the change of the amplitude modulation of said amplitude modulated alternating-current signal received by said signal receiving section.

28. A direct-current power supply circuit comprising:

a signal receiving section for receiving an alternating-current signal from outside of the direct-current power supply circuit;

a rectifying section for rectifying an output of said signal receiving section;

a smoothing section for smoothing an output of said rectifying section;

a first control section for controlling operation of a switching section to produce a constant voltage, said switching section changing the voltage level of an output of said smoothing section; and a second control section connected between said signal receiving section and said first control section for prohibiting the switching operation of said switching section in accordance with a signal condition of the alternating-current signal received by said signal receiving section, the prohibition of the second control section having priority over the control of said first control section, wherein said second control section prohibits the switching operation of said switching section in response to a change of amplitude modulation of said alternating-current signal received by said signal receiving section, and wherein said first control section is an analog circuit and said second control section is constituted primarily by a digital circuit.

29. A direct-current power supply circuit comprising:

a coil for receiving an amplitude modulated alternating-current signal from outside of the direct-current power supply circuit;

a rectifying circuit for rectifying an output of said coil;

a capacitor for smoothing an output of said rectifying circuit;

a clamp circuit for controlling the operation of a switching element to produce a constant voltage, said switching element controlling charging and discharging operations of said capacitor; and a switching operation control circuit connected between said coil and said clamp circuit to directly detect said amplitude modulated alternating-current signal from said coil, said switching operation control circuit executing a turning-off operation of said switching element in accordance with a signal condition of detected amplitude modulated alternating-current signal, said turning-off operation of said switching element having priority over the control of said clamp circuit.

30. The direct-current power supply circuit in accordance with claim 29, wherein said switching operation control circuit executes the turning-off operation of said switching element in response to a change of amplitude modulation of said alternating-current signal received by said coil.

31. The direct-current power supply circuit in accordance with claim 29, wherein said clamp circuit is an analog circuit and said switching operation control circuit is constituted primarily by a digital circuit.

32. The direct-current power supply circuit in accordance with claim 31, wherein the direct-current power supply circuit is incorporated in an IC card to or from which information is written or read, and wherein the constant voltage produced by said first control section is used to activate a semiconductor integrated circuit incorporated in said IC card.

33. The direct-current power supply circuit in accordance with claim 29, wherein said amplitude modulated alternating-current signal received by said coil is changeable up to 100% in degree of amplitude modulation, and wherein said switching operation control circuit executes the turning-off operation of said switching element in response to the change of the amplitude modulation of said amplitude modulated alternating-current signal received by said coil.

34. The direct-current power supply circuit in accordance with claim 33, wherein said clamp circuit is an analog circuit and said switching operation control circuit is constituted primarily by a digital circuit.

35. The direct-current power supply circuit in accordance with claim 34, wherein the direct-current power supply circuit is incorporated in an IC card to or from which information is written or read, and wherein the constant voltage produced by said first control section is used to activate a semiconductor integrated circuit incorporated in said IC card.

36. A direct-current power supply circuit comprising:

a coil for receiving an alternating-current signal from outside of the direct-current power supply circuit;

a rectifying circuit for rectifying an output of said coil;

a capacitor for smoothing an output of said rectifying circuit;

a clamp circuit for controlling the operation of a switching element to produce a constant voltage, said switching element controlling charging and discharging operations of said capacitor; and a switching operation control circuit, connected between said coil and said clamp circuit, for executing a turning-off operation of said switching element in accordance with a signal condition of the alternating-current signal received by said coil, said turning-off operation of said switching element having priority over the control of said clamp circuit, wherein said switching operation control circuit executes the turning-off operation of said switching element in response to a change of amplitude modulation of said alternating-current signal received by said coil, and wherein said clamp circuit is an analog circuit and said switching operation control circuit is constituted primarily by a digital circuit.

* * * * *